March 29, 1966     E. BOSTONIAN     3,243,659
DETACHABLE BALLAST UNIT FOR A FLUORESCENT LIGHT
Filed Dec. 5, 1961     9 Sheets-Sheet 1
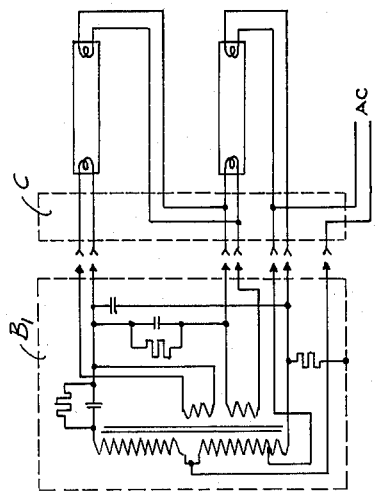
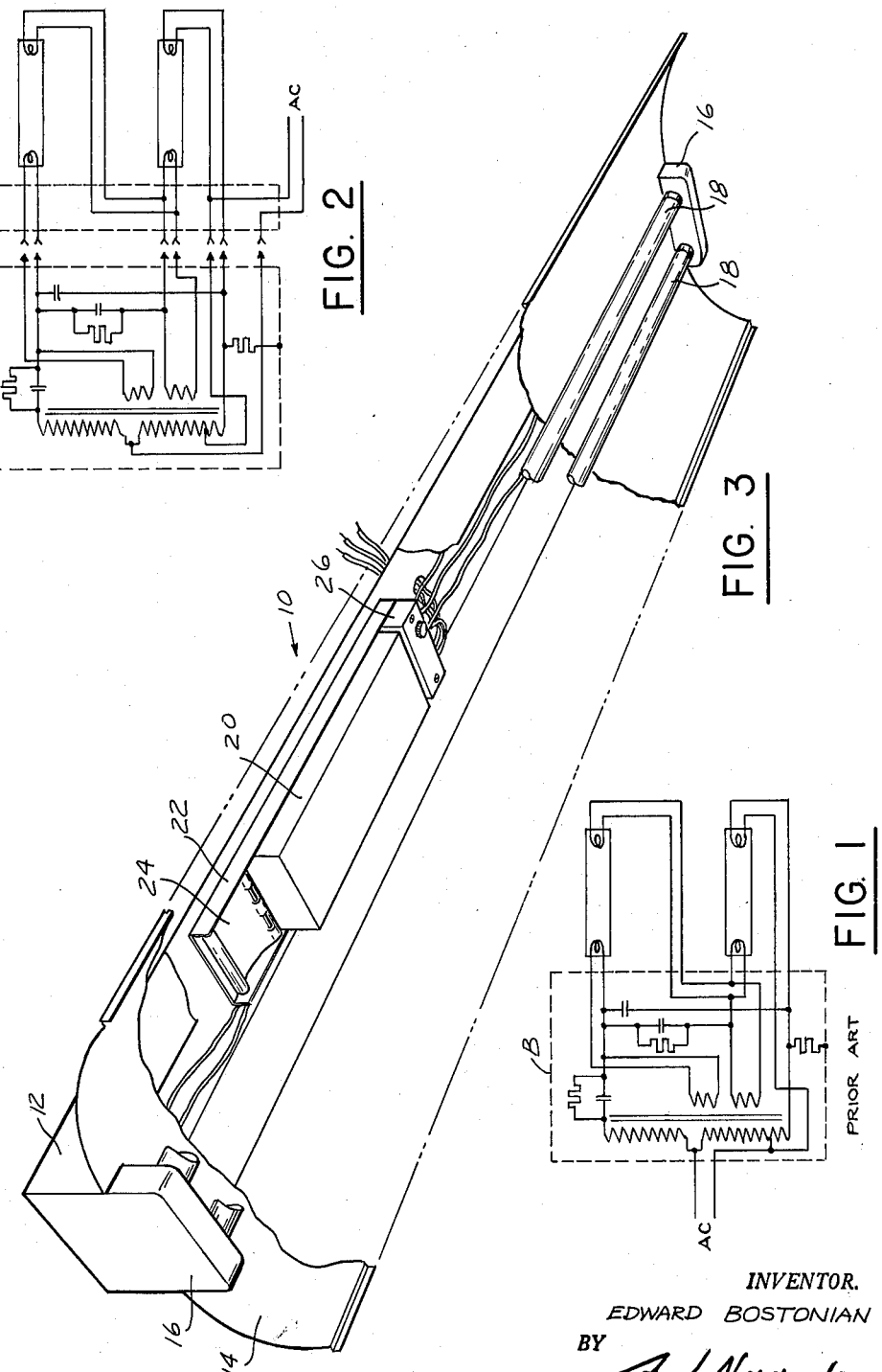
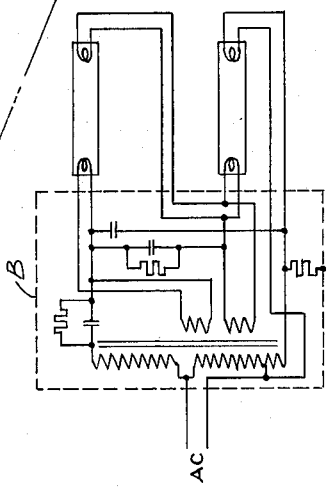
INVENTOR.
EDWARD BOSTONIAN
BY
ATTORNEYS March 29, 1966   E. BOSTONIAN   3,243,659
DETACHABLE BALLAST UNIT FOR A FLUORESCENT LIGHT
Filed Dec. 5, 1961   9 Sheets-Sheet 2

INVENTOR.
EDWARD BOSTONIAN
BY
*A. J. Nydick*
ATTORNEYS

INVENTOR.
EDWARD BOSTONIAN
BY
ATTORNEYS

March 29, 1966 E. BOSTONIAN 3,243,659
DETACHABLE BALLAST UNIT FOR A FLUORESCENT LIGHT
Filed Dec. 5, 1961 9 Sheets-Sheet 5
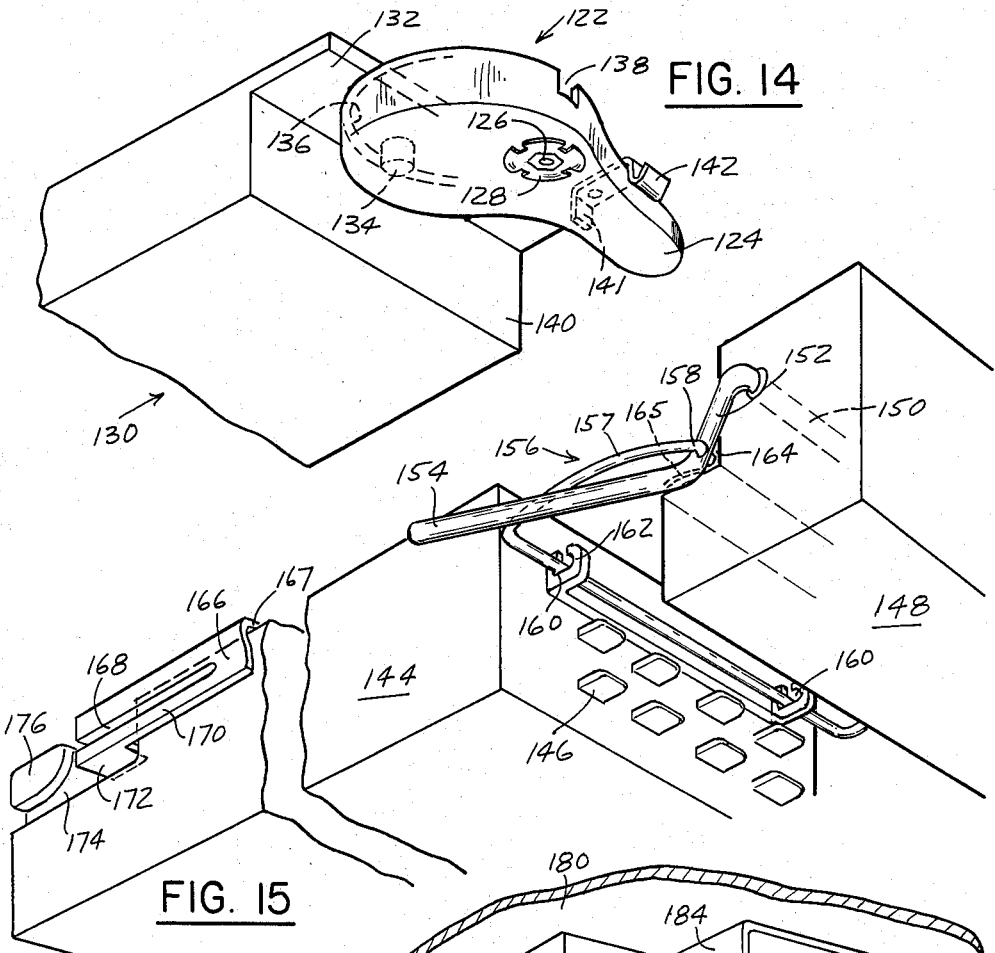
FIG. 14
FIG. 15
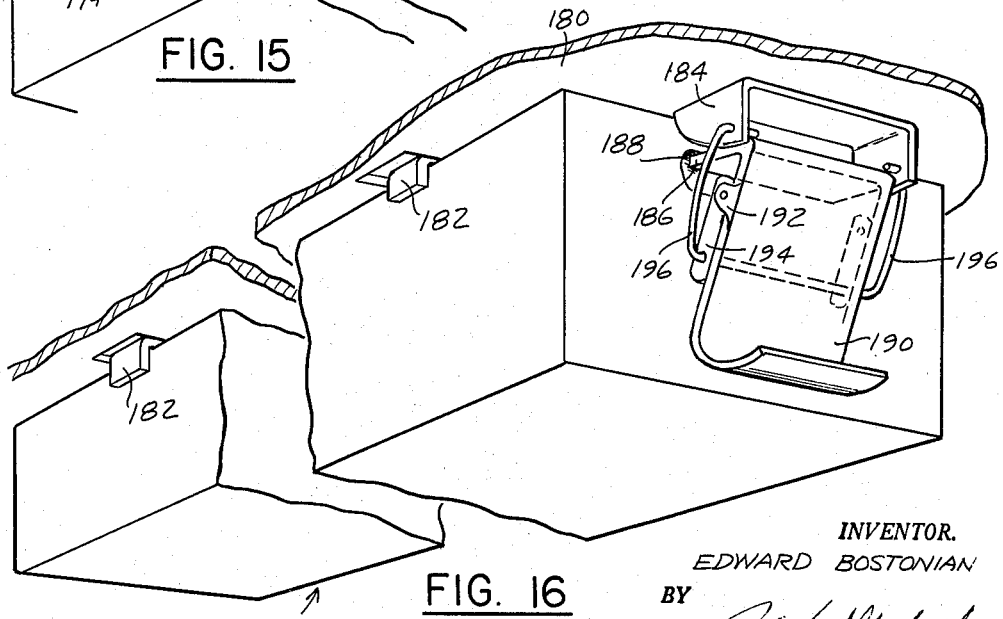
FIG. 16
INVENTOR.
EDWARD BOSTONIAN
BY
ATTORNEYS March 29, 1966 E. BOSTONIAN 3,243,659
DETACHABLE BALLAST UNIT FOR A FLUORESCENT LIGHT
Filed Dec. 5, 1961 9 Sheets-Sheet 6
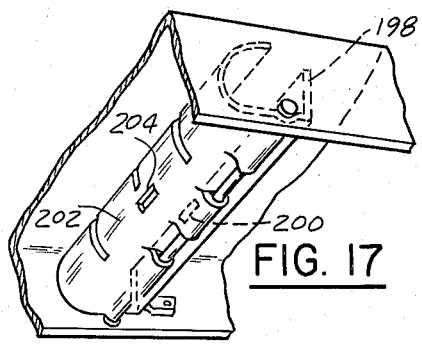
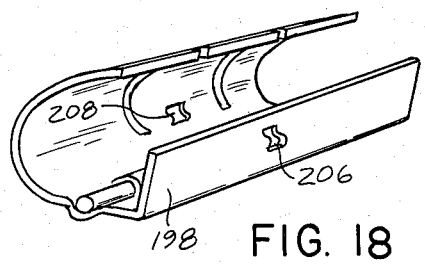
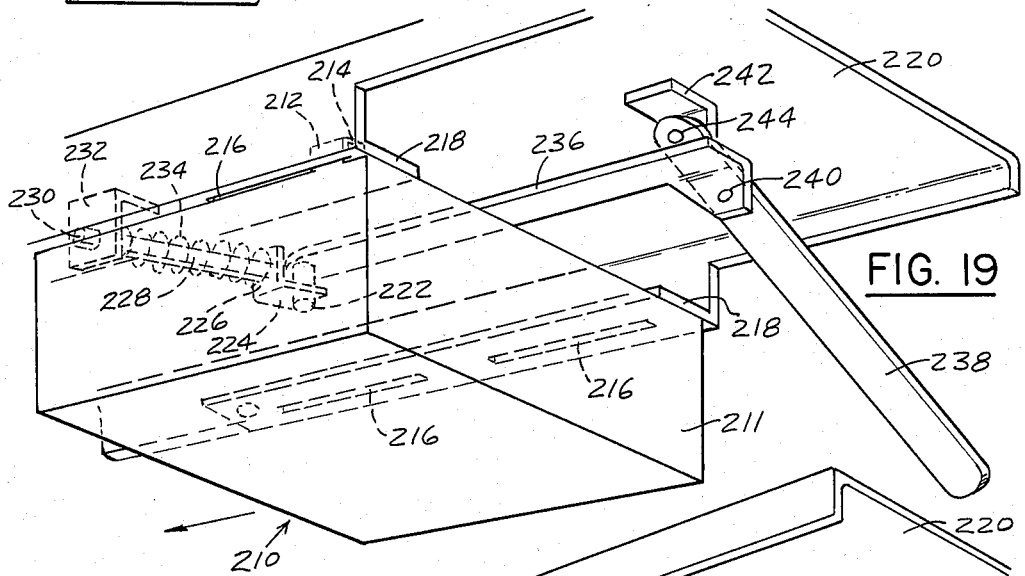
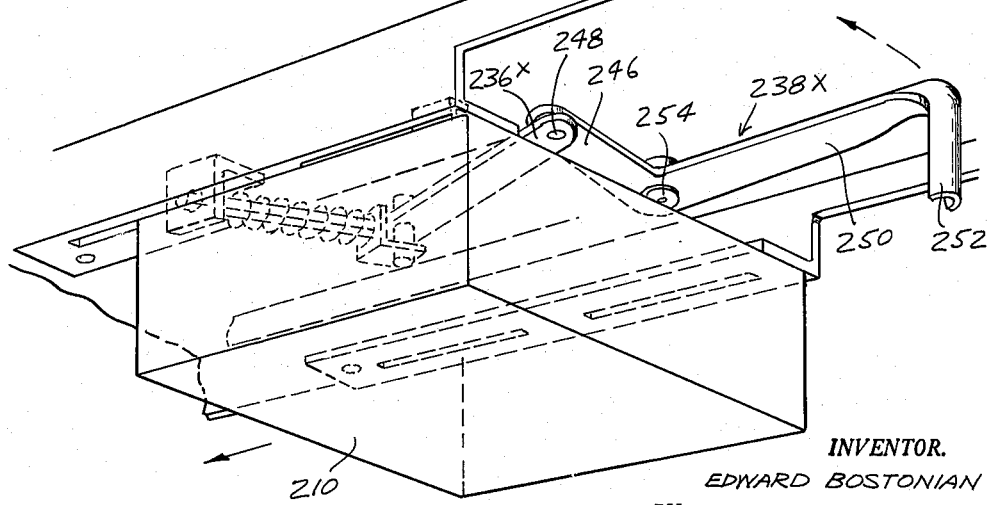
INVENTOR.
EDWARD BOSTONIAN
BY
ATTORNEYS

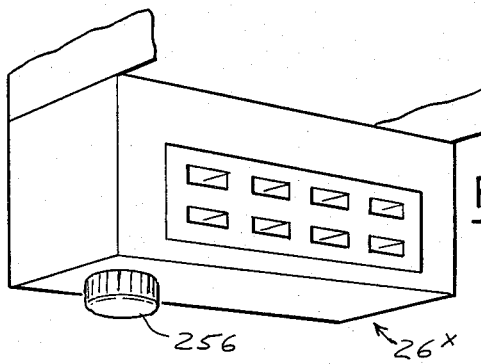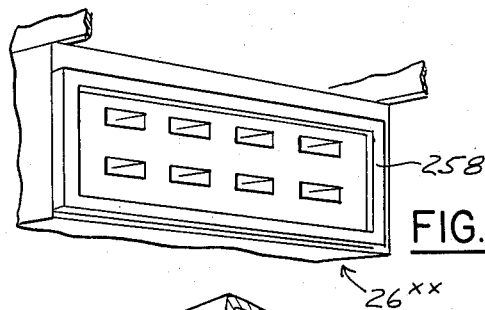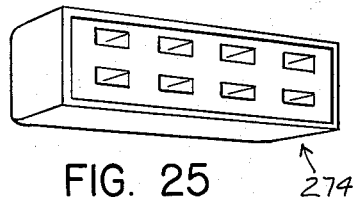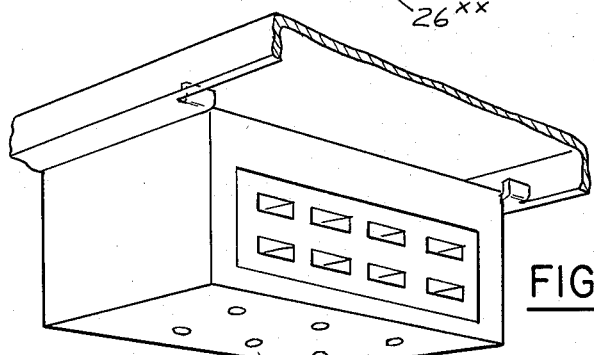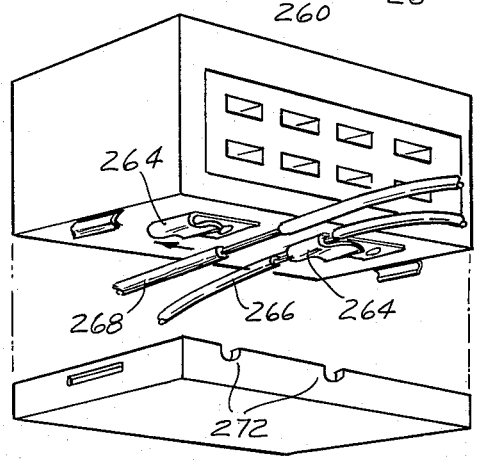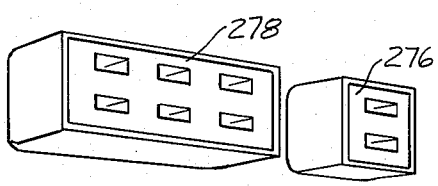

March 29, 1966      E. BOSTONIAN      3,243,659
DETACHABLE BALLAST UNIT FOR A FLUORESCENT LIGHT
Filed Dec. 5, 1961      9 Sheets-Sheet 9
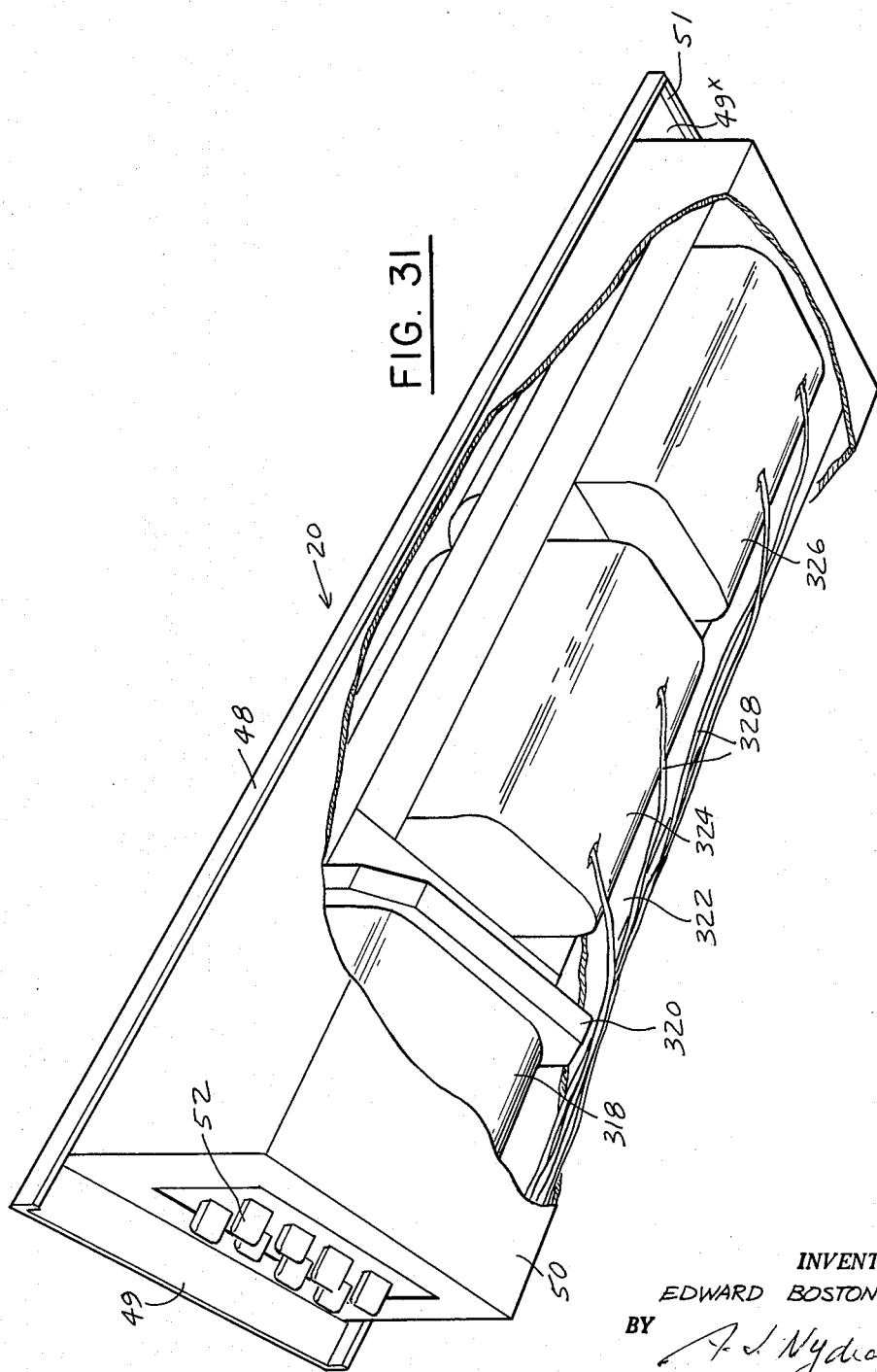
INVENTOR.
EDWARD BOSTONIAN
BY
ATTORNEYS

3,243,659
DETACHABLE BALLAST UNIT FOR A
FLUORESCENT LIGHT
Edward Bostonian, 3522 15th St., Brooklyn, N.Y.
Filed Dec. 5, 1961, Ser. No. 157,131
11 Claims. (Cl. 317—99)

This invention relates primarily to fluorescent lighting equipment.

In one of its more particular aspects, it is directed to improved means which provide for the quick insertion and locking of the ballast employed in connection with a fluorescent lighting fixture, in mounted position either when housed in said fixture or when disposed exteriorly thereof; and when necessary for the quick unlocking and removal of said ballast.

A fluorescent lighting fixture fundamentally comprises: a tubular light source and a ballast. The "ballast" may include in addition to the ballasting element per se, a supplemental element such as a capacitor. Generally, the ballast is mounted in a suitable fixture body or exteriorly thereof.

In the case, especially of higher lumen output light sources, for example, 7000 lumens or more per lamp, the customary two-lamp ballast weighs at least 12 pounds and constitutes a necessary part of the fluorescent light fixtures. Similarly, 15,000 lumen lamps require 19 pound ballasts. (Experimental lamps have already been produced with roughly 30,000 lumens output requiring ballasts weighing over 30 pounds.) Such ballasts are customarily secured permanently in position by conventional nut and bolt fastenings within the fixture body or may be so mounted on a support disposed exteriorly of the body. In the great majority of cases, it is important that the mechanical fastening of the ballast housing to the supporting medium be made tightly to provide satisfactory heat conduction or dissipation from the ballast to the supporting member in order to prevent possible overheating and resultant premature failure of the ballast.

Also in the great majority of cases, ballasts are equipped with 7 or 8 permanently connected wire leads requiring connections to the branch circuit feeder wires and to the lamp socket terminals. Failure or poor connection in any lead wire can seriously affect operation of the entire fixture assembly.

Accordingly, since most lighting fixture manufacturers do not produce ballasts, or if they do, ordinarily not in the same plant where the fixtures are produced, the relatively heavy ballast component is usually required to be shipped separately from the ballast factory to the fixture factory. Then the ballast requires handling in the assembly, moving and packing in its incorporation as part of a complete lighting fixture. After this, the fixture factory ships the entire weighty assembly usually to the site of an installation. When, for example, 1000 to 10,000 fixtures are installed in a building the following charges attributable and apportionable to the ballasts are substantial, in total. Transportation charges for shipment from the fixture factory to the job site; fixture factory handling charges for receiving, storing, assembly, moving, packing and shipment; fixture factory charges for purchase and resale of a relatively expensive prefabricated component; higher labor costs for handling such heavy lighting fixtures in the process of installation.

Furthermore, when ballast failure occurs, replacement entails: time consuming disconnection of each of the mechanical and electrical connections, and reconnection of those structural elements of the replacement ballast. Frequently this is done during working hours and in such cases it results in very costly disruption of productive work by employees in the affected areas, and in adjacent areas as well wherein the observant curiosity of some employees reduces their productive efficiency.

When an abnormally large number of ballast failures occur after installation and within a guaranteed period prescribed by the ballast manufacturer, the ballast manufacturer, in addition to providing a free replacement for the defective devices, quite often is required to bear the high labor cost involved in such replacement—labor costs which often run up to several dollars or more per ballast for each ballast requiring replacement.

Accordingly, it is among the principal objectives of this invention to provide novel means which allow for the quick insertion and locking within the lighting fixture, or exteriorly thereof, a ballast in its operative position; and, when the occasion arises to allow for the quick unlocking and removal of a malfunctioning ballast and the quick replacement by a properly functioning device.

Such object is provided by the employment of a ballast supporting structure which assures proper positioning and holding of the ballast in said support upon actuation of a locking device which is quickly closeable to tightly hold the ballast in said support and is quickly openable to release the ballast.

In connection with the attainment of said object, I further provide the ballast with an improved electrical connector unit which provides all the electrical connections into and out of the ballast; and also provide a mating electrical connector which provides current input to the ballast and distributes the output therefrom to the fluorescent tubes.

Accordingly, it is another object of the invention to provide an improved ballast structure which obviates the need for fluorescent lighting fixture manufacturers to include a ballast as an integral component of each fixture shipped from their factories.

Thus, another object of the invention is to provide a ballast wherein electrical connection is achieved by providing the ballast with an improved connector unit for quickly interfitting with cooperative elements in the electrical circuit.

In its basic aspects, one of the foregoing objects is achieved by mechanical means for positioning, propelling, and locking the ballast and holding it in locked position under pressure; and for extracting the ballast when necessary. Such means provide the force required to secure the ballast firmly in position under substantial pressure against the fixture housing or exterior support thereby enabling one to achieve the necessary dispersion, through conduction, of the heat. Such means also enables one to effectuate positive engagement with, and withdrawal from, the interfitting electrical connecting elements.

The mechanical propulsion and extraction aforesaid may be achieved by means of a lever, crank drive or cam drive or other suitable mechanism.

The ballasts of this invention are markedly superior because the prior structures or devices embodying frictional electrical connectors were defective in connection with the non-specific location of the electrical connection elements in relation to the "hot spots" of the ballast. When electrical connections of the pin type (frictional engagement) are located at the transformer end of the ballast (the induction end), high temperature may be generated in the electrical connection because the induction component is the major source of heat. In such cases, temperatures may be reached of such magnitude as to result in the ultimate degradation of the electrical connections.

Such superiority is attained by positioning all of the frictional electrical connections at the low temperature portion of the ballast.

Electrical connectors which will provide trouble free functioning require substantial force to effect interfitment and disengagement. Structures which employ spring clips as a single electromechanical device are subject to failure in holding the ballast mechanically when the electrical connection, through some defect, becomes overheated or short circuited. Also such spring pressure does not insure requisite pressure between the ballast and the support therefor needed to assure proper heat dispersion from the ballast to the housing or support.

My means provides for ease in producing the force required for such interfitment and disengagement and assurance of heat conduction.

In one of its aspects, a ballast, in accordance with this invention, is provided with feet or legs thereof in the form of toe-like elements extending beyond the body of the ballast. One of the end walls of the ballast is provided with an electrical connector or unit adapted to interfit with a cooperating mating receptacle. The opposite end wall of the ballast is provided with means as for example, a flange or lip which allows for engagement with the propelling, locking and extracting means and also provides for the initial retention of the ballast in the course of its intended positioning.

When the electrician sets about inserting such a ballast, as for example into a fluorescent lighting fixture, the flange or tongue or lip at the second mentioned end wall is slipped angularly between a suitable holding means and the propelling, locking and extracting member. With the body of the ballast at this end against the locking and extracting member, clearance is then provided for full insertion of the opposed end of the ballast into the holding means and for alignment of the electrical connector with the mating receptacle. The electrician then actuates the propelling, locking and extracting member against the body of the ballast to drive the ballast into electrical and mechanical connection at the other end.

With the propelling, locking and extracting member in the fully closed position, the ballast flanges at both ends are maintained under pressure, and the ballast locked in place.

To remove the ballast, the electrician reverses the motion of the propelling, locking and extracting member.

The structure may also be provided with a supplementary safety lock, or locks.

The various aspects of the instant invention are directed to a member which provides for propelling, locking and extracting a ballast; a guiding and confining holder for holding the ballast in operative position; a ballast provided with an electrical connector unit as mentioned above; and a mating female electrical connector; optionally, the provision of means for effectuating snap action connection and disconnection of the electrical connector unit. There may be additionally, a spring safety lock at the connector end of the ballast support, which also serves as an automatic aligning device for the interfitment of the electrical connector components.

A fuller understanding of the invention will become apparent from the more detailed description thereof taken in connection with the accompanying drawing wherein:

FIG. 1 is a diagrammatic illustration showing the circuitry of a fluorescent light based on conventional wiring of the components.

FIG. 2 is a diagrammatic illustration showing the circuitry of a fluorescent light wherein the ballast is provided with an electrical connector unit in accordance with this invention.

FIG. 3 is a perspective view of a fluorescent lighting fixture having a novel ballast with a connector unit in accordance with this invention and as mounted in accordance with an aspect of this invention.

FIG. 13A shows diagrammatically the first step in the mounting of a ballast illustrated in FIG. 13.

FIG. 13B shows diagrammatically a further step in the mounting of a ballast illustrated in FIG. 13.

FIG. 13C shows diagrammatically a still further step in the mounting of the ballast illustrated in FIG. 13.

FIG. 13D shows diagrammatically the ballast of FIG. 13 in the fully mounted and locked position.

FIG. 14 is a perspective view showing another form of a ballast propelling, locking and extracting means.

FIG. 15 is a perspective view showing a still further modification of a ballast propelling, locking and extracting means.

FIG. 16 is a perspective view showing a locking means for securing a ballast.

FIG. 17 is a perspective view of a further modification of the propelling, locking and extracting means.

FIG. 18 is a perspective view showing a still further modification of the propelling, locking and extracting means of FIG. 17.

FIG. 19 is a perspective view showing a mating electrical receptacle as amplified by the inclusion of mechanism which provides accelerated movement of the receptacle in accordance with this invention.

FIG. 20 is a perspective view showing a modification of the structure of FIG. 19.

FIG. 21 is a perspective view of a mating receptacle which includes an overload device.

FIG. 22 is a perspective view of a mating receptacle including gasketing to provide fluid tightness.

FIG. 23 is a perspective view of a mating receptacle in accordance with FIG. 8, including holes for insertion of electrical test probes.

FIG. 24 is a perspective view of a mating receptacle including means to effect direct terminal tapping from uninterrupted line leads.

FIG. 25 is a perspective view of a mating receptacle which is not fixedly mounted.

FIG. 26 is a perspective view of the receptacle of FIG. 25 comprising two sub-units.

FIG. 31 is a perspective view showing the internal disposition of major components of a ballast constructed in accordance with the invention.

Figure 4:
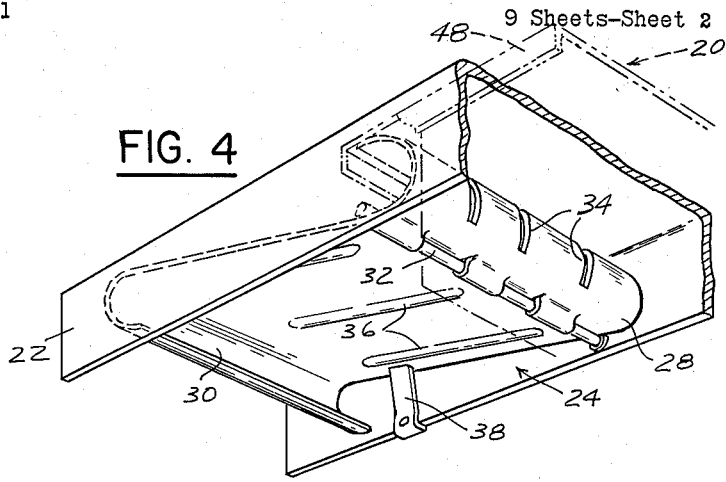
FIG. 4 is a perspective view of an enlarged scale showing particularly the propelling, locking and extracting means utilized for manipulation of the ballast as shown mounted in FIG. 3.

In FIG. 1 there is shown a diagrammatic arrangement of the circuitry of a fluorescent lighting unit whereof the part enclosed within the dotted lines B designates the ballast. All of the wire leads from the ballast are connected in conventional fashion in the usual manner.

In FIG. 2 there is shown a diagrammatic arrangement of the circuitry of a fluorescent lighting unit providing the same arrangement as in FIG. 1, except that the ballast member $B_1$ (shown in dotted lines) is provided with a connector unit having prongs, the latter of which fit into a mating receptacle designated by the member C shown in dotted lines.

In FIG. 3 there is shown a fluorescent lighting fixture 10. The ballast 20, in accordance with this invention, is shown housed in channel 12, being mounted in a holder or support in form of a channel 22. One end of the ballast is shown as locked in position by means of propelling, locking and extracting member 24. The other end of the ballast is shown as being interfitted with a mating electrical connector 26. The fixture also comprises reflector 14, lamp sockets 16 and tubular lamps 18.

Figure 5:
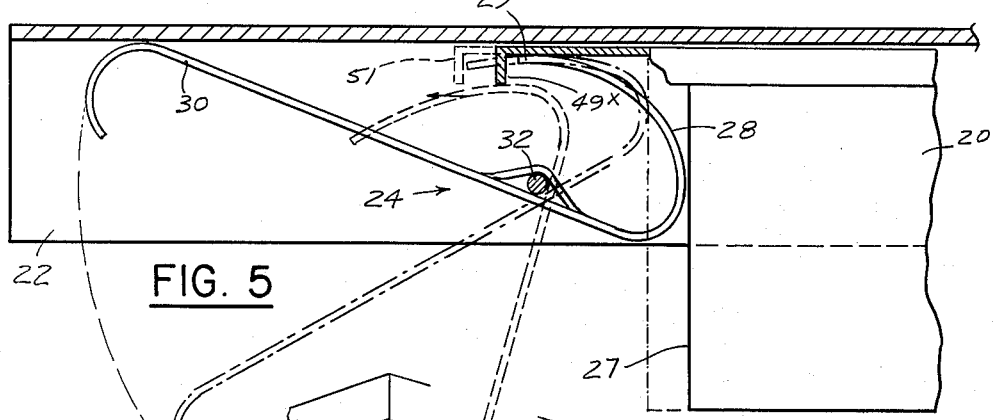
FIG. 5 is a sectional view of the structure shown in FIG. 4.

FIGS. 4 and 5 show in greater detail the structure of member 24 which comprises an arcuate element 28 and a handle 30 provided with means for receiving a pivot shaft 32. Element 28 may be slotted as at 34. Handle element 30 may be provided with stiffening ribs 36. The handle 30 may be additionally secured against displacement by resilient safety catch 38.

Figure 6:
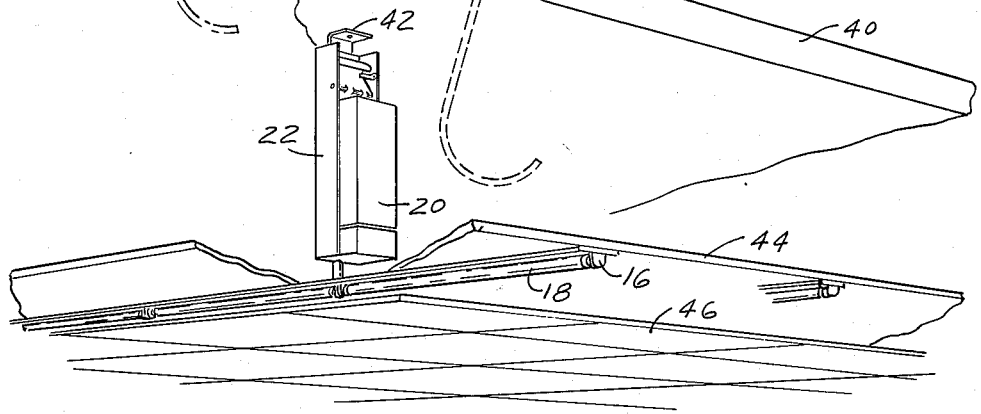
FIG. 6 is a perspective view of a fluorescent lighting unit wherein a ballast in accordance with an aspect of this invention is mounted exteriorly of the lighting fixture.

In FIG. 6 there is shown an arrangement wherein the ballast 20 is mounted in a holder 22 disposed exteriorly of light source. Holder 22 is suspendedly attached to ceiling 40 by means of bracket 42 above false ceiling 44, the latter carrying sockets 16 and tubes 18, beneath which are mounted light diffusing panels 46.

Figure 7:
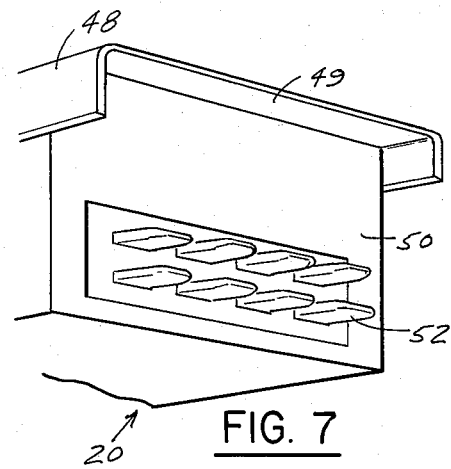
FIG. 7 is a perspective end view of a ballast having an electrical connector unit in accordance with this invention.

FIG. 7 shows ballast 20 having ballast base 48 which extends in form of a toe 49 beyond the end of the body portion 50 which includes an electrical connector unit having male prongs 52.

Figure 8:
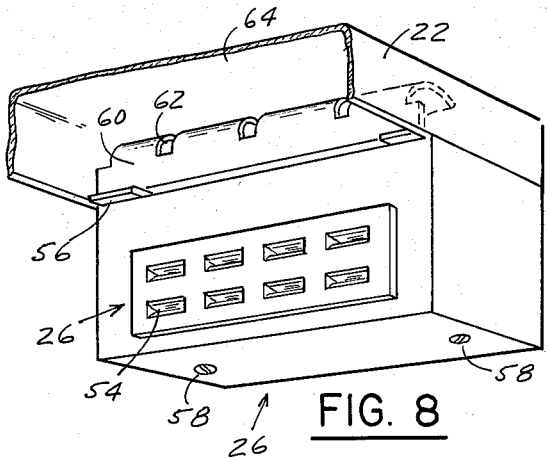
FIG. 8 is a perspective end view of a mating receptacle to engage the prongs of the electrical connector unit illustrated in FIG. 7; and also spring means for engaging under pressure, a toe-like extension from the base of the ballast at the connector end thereof.

FIG. 8 shows mating connector 26 provided with interfitting female elements 54 for reception of prongs 52. Mating connector 26 is affixed to holder 22 as at shoulder 56 as by machine screws 58. Arcuate spring 60 (which may be slotted as at 62) provides means for tightly holding toe 49 against the base 64 of 22. The base of 60 may be suitably bored to receive screws 58.

Figure 9:
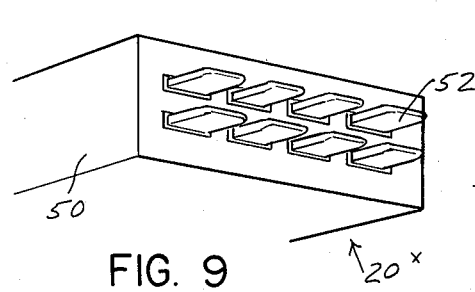
FIG. 9 is a perspective end view of a ballast akin to that of FIG. 7, but without the toe-like extension.

FIG. 9 is an end view of a ballast $20^x$ akin to that of FIG. 7 but without the toe 49.

Figure 10:
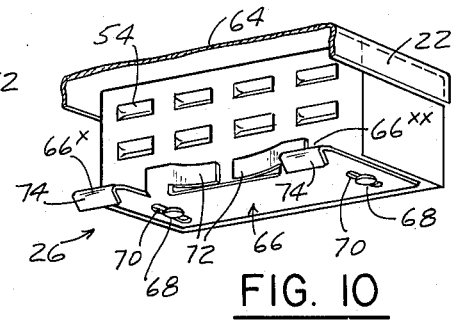
FIG. 10 is a perspective view of a mating receptacle to engage the prongs of the electrical connector unit illustrated in FIG. 9; and also spring means for engaging, under pressure, the ballast against the support therefor.

FIG. 10 shows a mating receptacle 26 mounted in holder 22 adapted for reception of the ballast $20^x$. Affixed to the underside of the mating receptacle is a spring 66 bifurcated as at $66^x$ and $66^{xx}$ which provides for tight holding of the ballast $20^x$ against 64. Spring 66 is slidingly engaged by pins 68 which pass through slots 70. Spring 66 is provided with longitudinally acting springs 72 which normally maintain 66 in extended position. Each of the bifurcated elements $66^x$ and $66^{xx}$ is provided with a depending lip 74, slight inclined toward the receptacle.

Figure 11:
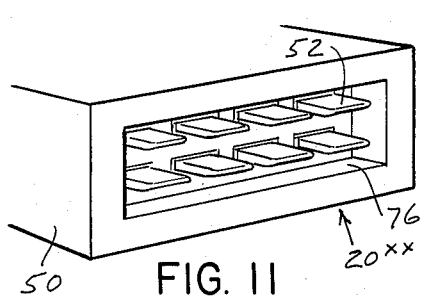
FIG. 11 is a perspective end view of a ballast wherein the prongs of the electrical connector unit thereof are in recessed disposition.

FIG. 11 is an end view of a ballast $20^{xx}$ having a body 50, an electrical connector with prongs 52. The prongs are set within recess 76.

Figure 12:
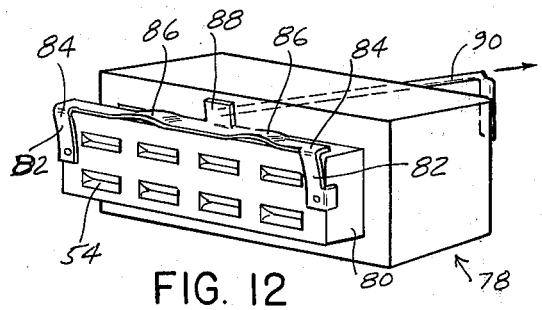
FIG. 12 is a perspective view of a mating receptacle to engage the prongs of the electrical connector unit illustrated in FIG. 11; and also spring means for engaging, under pressure, the ballast against the support therefor.

FIG. 12 shows a mating receptacle 78 having an outwardly extending section 80 with interfitting female elements 54 for reception of the prong 52 of $20^{xx}$. Section 80 is configured to set within recess 76. Affixed to 80 is a spring 82 having forwardly disposed corners 84 and upwardly disposed sections 86. Spring 80 also has a lip 88 to which is affixed a handle 90.

Figure 13:
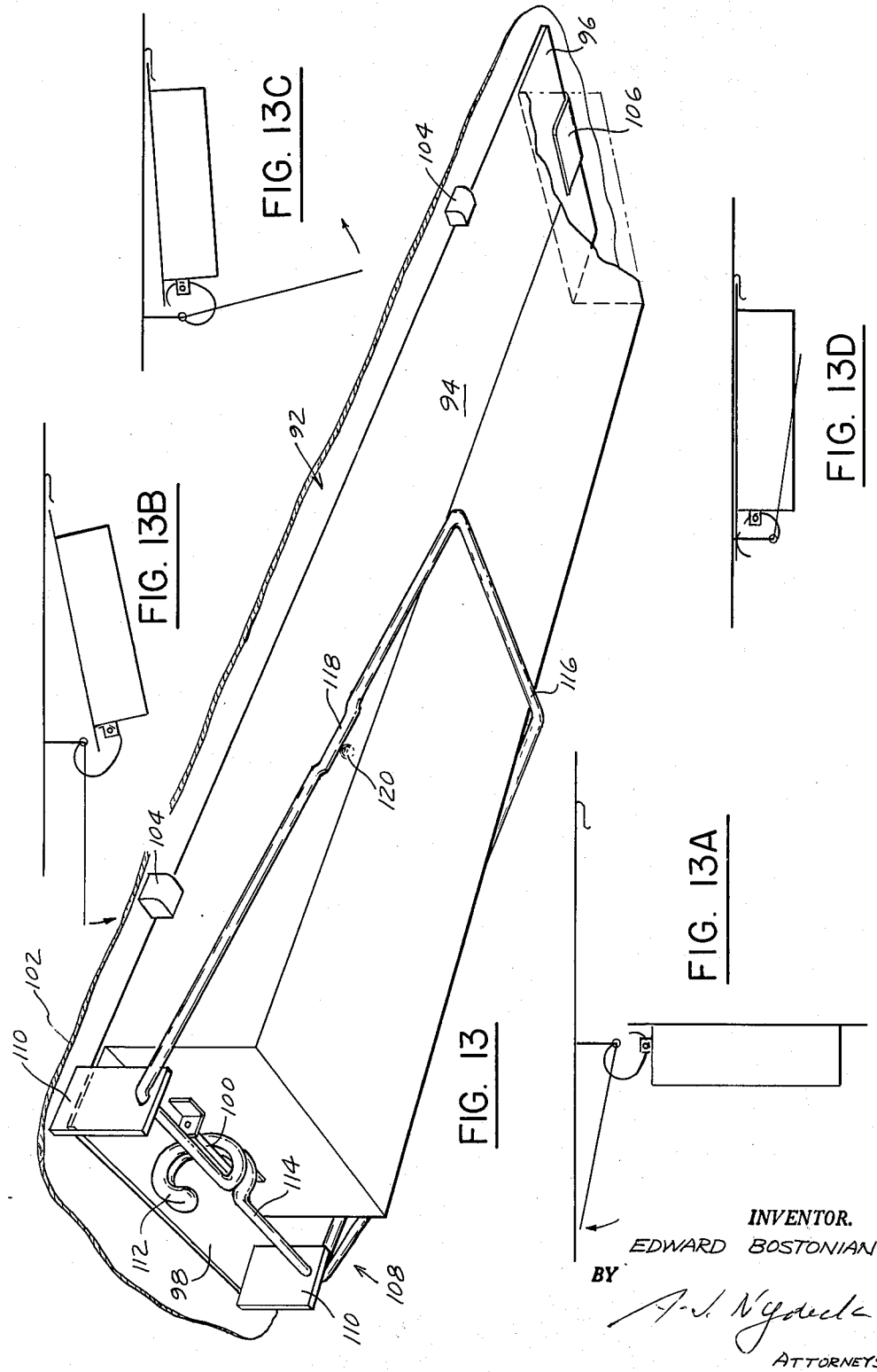
FIG. 13 is a perspective view showing another form of a propelling, locking and extracting device in accordance with this invention.

In FIG. 13, 92 designates a ballast having a body 94 and toes 96 and 98 at the ends thereof. The ballast 92 is provided with a yoke 100. The ballast support 102 is provided with ballast guides 104 and spring clip 106. Propelling, locking and extracting member 108 (pivotally mounted on elements 110) comprises the arcuate or hooked element 112 carried by shaft 114, the shaft being actuated by handle 116. The handle 116 is indented as at 118 in the region of projection 120 on ballast body 94.

In FIG. 14 the propelling, locking and extracting member comprises a cup-shaped cam 122 having a handle 124, the cam being carried by a pivot pin 126 in combination with a spring washer 128. The ballast 130 has a toe 132 from which depends a pin 134 which is disposed in engagement with the inner side of the wall 136 of cup-shaped cam 122. Wall 136 has a slot 138 which allows for entrance of 134. The outer side of 136 bears against the end wall 140 of the ballast. Movement of the handle in effecting the locking of the ballast is limited by stop 141. This stop includes safety catch 142.

In FIG. 15 the numeral 144 designates a ballast having an electrical connector, the prongs 146 (akin to 52) of which interfit into a mating connector 148. The propelling, locking and extracting member, in this instance, comprises a U-shaped member 150 set within 148. One of the legs 152 is extended to constitute a handle 154. Affixed to the leg 152 is a U-shaped spring 156, as at 158. The cross piece of 156 sits within the bayonet slots 160 of element 162 extending outwardly from 144. Receptacle 148 is provided with a recess 164, equipped with spring 165. Actuation of handle 154 effects movement of ballast 144 into and out of interfitment with 148. Ballast 144 is carried by holder 167, (akin to 22) which is provided with a flange 166 slotted as at 168. The lowermost element 170 of the slotted flange carries a tongue 172 which extends inwardly and engages a suitably conformed portion 174 of 144, such conformation providing a wedge shaped piece 176. Wedge 176 rides within the space between the inner surface of the holder and the resilient tongue 172.

In FIG. 16, the numeral 178 designates a ballast carried by a support 180 within lateral guide members 182, an element (not shown) to support the rear end of the ballast, and a front end guide member 184. The locking member comprises a tongue 186 (adapted to move within a mating recess 188) carried by handle 190. Handle 190 is connected at ear 192 to link 194, which is connected with U-shaped spring 196, the ends of which are carried by guide 184.

In FIG. 17, the structure shown is in part the same as that of FIGS. 4 and 5, except that the handle 30 is truncated and bent to provide member 198. Member 198 is pierced as at 200 and the arcuate 202 is pierced as at 204. These piercings provide means for inserting a screw driver so that the structure can be actuated as if it included the handle portion of FIGS. 4 and 5.

In FIG. 18, the structure is similar to that of FIG. 17, except that the piercings 206 and 208 are specially configured to accommodate a matingly configured tool in lieu of the screw driver above mentioned, so as to provide for actuation only by selected personnel.

In FIG. 19 there is shown a movable mating receptacle arranged for interfitment with a ballast having prongs as above described. The mating receptacle 210 has upwardly extending toes 212 with inturned lips 214. Toes 212 ride within slots 216. Thus 210 is suspendedly and slidingly carried by rails 218, depending from support 220. The moving mechanism comprises pin 222 carried by 210. Pivoted thereto is right angled bracket 224, leg 226 carrying shaft 228, the free end 230 of which rides within a hole in bracket 232. Helical spring 234 is axially and freely mounted on shaft 228. Arm 236 is pivotally connected to pin 222 and to handle 238 at 240.

Handle 238 is connected to bracket 242, carried by 220, by pivot 244.

In FIG. 20, the structure is similar to that of FIG. 19, except that arm 236$^x$ is connected to a modified handle member 238$^x$. Handle 238$^x$ is L-shaped, one leg 246 thereof being linked to 236$^x$ by pin 248, and other leg 250 terminating in a grip piece 252. The handle 238$^x$ is carried by 220 through the intermediacy of pin 254.

FIG. 21 shows a mating receptacle 26$^x$ akin to 26 (FIG. 8) with the addition of an overload device 256.

FIG. 22 shows a mating receptacle 26$^{xx}$ akin to 26 (FIG. 8) with the addition of a gasket 258.

FIG. 23 shows a mating receptacle 26$^{xxx}$ akin to 26 (FIG. 8) with the addition of test probe holes 260.

FIG. 24 shows a mating receptacle 262 with the addition of spring clips 264 which provide means for effecting "feed through" tapping of line feeder wires 266 and 268. A snap-on insulating cover 270 may be provided with notches 272 which engage the insulation of wires 266 and 268, thereby insuring proper positioning and preventing possible displacement of said wires.

FIG. 25 shows a mating receptacle 274 akin to 26 (FIG. 8) except that it is neither fixedly nor slidingly mounted.

FIG. 26 is a modification of FIG. 25 and comprises two subunits 276 and 278. The former, 276, provides for line feed connection to ballast and 278 output from ballast to the tubes.

Figure 27:
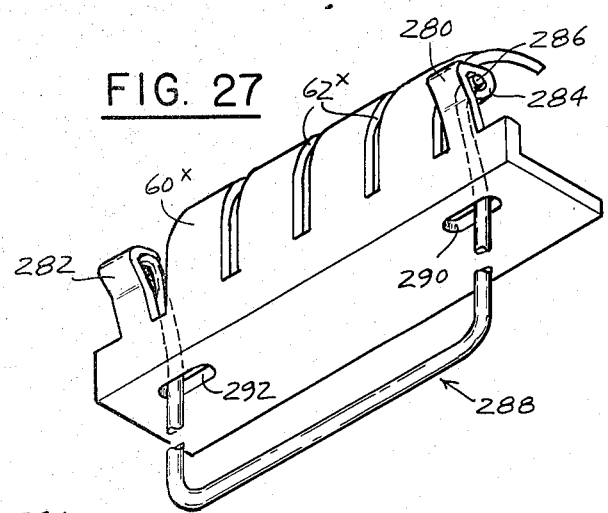
FIG. 27 is a perspective view showing a modification of the spring means illustrated in FIG. 8, said modification providing for automatic locking of the toe and alignment of the interfitting electrical connections.

In FIG. 27 the structure comprises arcuate spring 60$^x$, akin to 60 in FIG. 8, having slots 62$^x$ akin to 62. Additionally it includes angular spring members 280 and 282, the angular portions of which project forwardly of 60$^x$, and provide for automatic locking of a ballast.

The ends of 280 and 282 terminate in loops as at 284. Said loops receive the turned ends 286 of a U-shaped member 288 the legs of which pass through slots 290 and 292. Slots 290 and 292 provide a fulcrum for 288 so that movement of the latter effects release of the ballast engaged by spring members 280 and 282.

Figure 28:
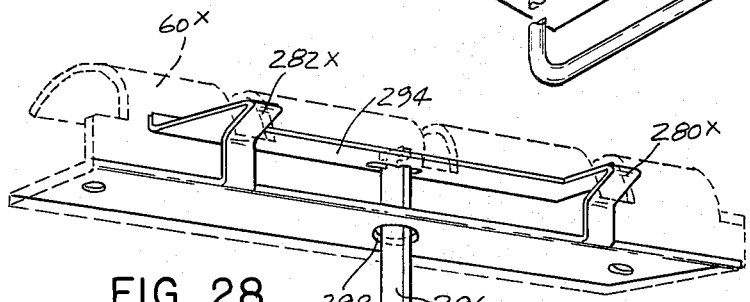
FIG. 28 is a perspective view showing a modification of the structure illustrated in FIG. 27.

FIG. 28 shows a modified form of the structure of FIG. 27 having angular spring members 280$^x$ and 282$^x$. The ends of 280$^x$ and 282$^x$ are connected by a cross piece 294. Piece 294 carries a handle 296 to effect release of spring members 280$^x$ and 282$^x$. The fulcrum movement of the handle is provided by the opening 298.

Figure 29:
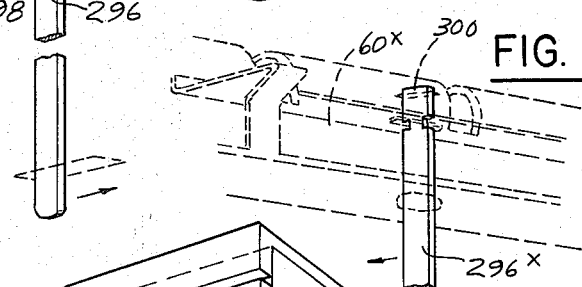
FIG. 29 is a perspective view showing a modification of the release handle of the structure of FIG. 28.

FIG. 29 shows a modified form of the structure of FIG. 28. The release handle 296$^x$ of this modification is fulcrumed at slot 300 in the arcuate spring 60$^x$.

Figure 30:
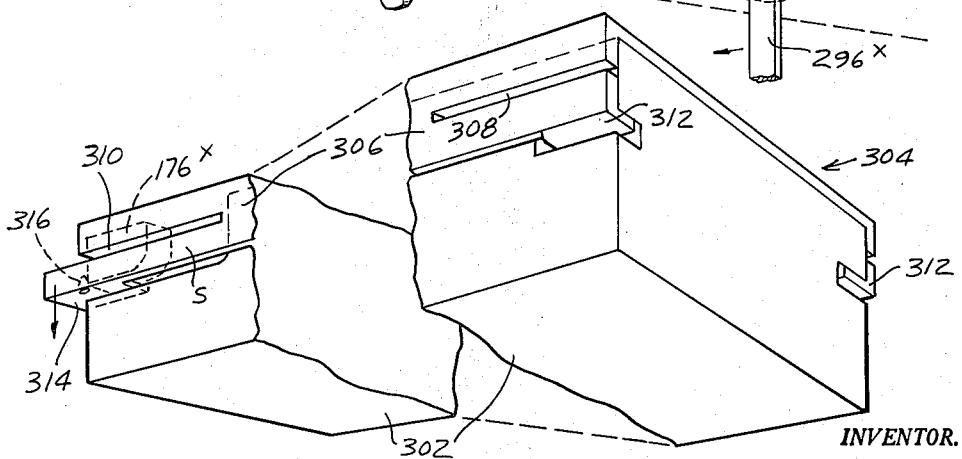
FIG. 30 is a perspective view of a ballast, partially broken away, to show another form of mounting the same on a support.

FIG. 30 shows a ballast 302 carried by a support 304 having flanges 306 (akin to 166, FIG. 15) slotted at 308 and 310 (akin to 168, FIG. 15). The lowermost elements of the slotted flanges carry a tongue 312 and 314, respectively (akin to 172 of FIG. 15). The forward portion of ballast 302 is recessed to receive toe 312. The rearward portion of 302 is akin to the corresponding portion of the ballast of FIG. 15. The lowermost element of the slotted flange at the rear extends beyond the uppermost portion of this slotted flange. In addition, the tongue 314 carries an upwardly projecting catch 316. When this ballast is inserted in the support and pushed into place, the catch 316 takes a position in back of the wedge 176$^x$, thereby locking the ballast.

FIG. 31 shows a perspective view of a ballast 20 (as in FIG. 3, the connector end of which is shown in FIG. 7). The ballast comprises base 48 and housing 50. The base includes at the connector end a toe 49, and at the other end a toe 49$^x$ which carries a dependent lip 51. Housing 50 is partially cut away to show the components housed therein. Numeral 318 designates a capacitor; 320 is a thermal insulator; which lies against the magnetic core 322 of a conventional inductive element comprising coils 324 and 326. The several leads of the inductive element (line and lamp circuits) designated generally as 328 are connected to the connector unit.

In carrying out an insertion of a ballast as shown in FIGS. 3, 4, 5, 7, 8 and 31 (a preferred embodiment of this invention), the procedure is as follows:

Member 24 is moved into open position as shown in dotted lines in FIG. 5. Then the ballast 20 is lifted angularly into the support or holder 22 with the toe 49$^x$ positioned above 28 and the end 27 of the ballast abutting 24 at the pivotal position. The ballast is then pushed separately against 22. Handle 30 is then moved until it is stopped by 22. That movement propels the ballast so that the prongs 52 enter the slots 54 of receptacle 26 (FIG. 8), while the toe 49 becomes wedged by 60. Arcuate element 28 is formed of spring stock. In this closed position 28 is under compression. Pressure is thus exerted against 49$^x$ and a corresponding pressure is thus exerted against the other end of 28, the effect of which is to keep handle 30 in locked position against 22. Safety catch 38 maintains such locked position until it is released.

To extract the ballast, the operation is as follows: Safety catch 38 is pressed to allow handle 30 to be pulled away from closed position. As the handle begins to move the end 29 of 28 moves toward lip 51, bears against it and thus extracts the ballast from engagement with receptacle 26 and out of the wedging action of arcuate spring 60.

Corresponding manipulation is followed in positioning and removing the ballast as shown in FIG. 6.

When a modified form of spring 60, as shown in FIG. 27, is employed, the angular spring members 280 and 282, provide an additional safety means for holding the ballast when it is pushed upwardly against 22. The toe 49 is thus automatically held by 280 and 282, which serve further to align the ballast for interfitment of prongs 52 with slots 54, and without handling the ballast to effectuate such alignment. It will be noted further that the supporting action of 280 and 282 in combination with the supporting action of 24 in open position, holds the ballast in place so that it will not drop, nor be removable until 288 is actuated.

The safety action of 280$^x$ and 282$^x$ (FIGS. 28 and 29) is similar to that of 280 and 282.

When installing a ballast to be held in position by the propelling, locking and extracting means illustrated in FIG. 14, the handle 124 is moved so as to bring the slot 138 into position which allows 134 of ballast 130 to pass through.

The opposite end of the ballast (not shown) is brought into alignment with a receptacle (see FIG. 8, for example).

Handle 124 is now rotated clockwise around pivot 126, thereby propelling ballast 130 (positioned and guided within a holder as described above) forward. When the ballast 130 is in fully engaged position, any movement of ballast end 140 against the cam will push handle 124 against stop 141. The handle is furthermore engaged by safety catch 142.

To extract the ballast, the safety catch 142 is moved to release handle 124, and the handle is then moved counterclockwise thereby retracting, through the pull on 134, the ballast.

In FIG. 15, the ballast shown is placed in operating position as follows: The ballast 144 is placed into position between flanges 166 while the U-shaped spring 156 is inserted in slot 160 of element 162. Handle 154 is then moved so as to pull ballast 144 forward thereby to effect engagement of the prongs by the mating slots in the receptacle 148. Elements 162 serve also to align the prongs of 144 with the slots of 148, and to tightly hold this end of the ballast against the holder by the pressure of spring 165. In the closed position the curved element 157 of spring 156 exerts pressure on handle 154 at pivot 158 thereby keeping the handle in locked position. If desired, the handle can be further secured by providing a safety catch to engage the same in locked position. In being pulled forward, the wedge element 176 enters into the tongue 172, and thus the ballast becomes locked in place.

To extract the ballast, the handle 154 is moved in the opposite direction thereby effecting withdrawal of the prongs at the connector end and also releases the wedging piece 176.

When installing a ballast to be held in position by the locking means shown in FIG. 16, the ballast 178 is placed between lateral guide members 182 and end guide 184 and suitable holder at the other end. By actuating the handle 190 into the position shown, the ballast is locked into place, by means of tongue 186 which enters into recess 188. The spring tension of element 196 bearing against 194 effectuates locking of the handle.

On pulling the handle 190 out of the locked position, the ballast is released at this end.

In FIGS. 19 and 20, the ballast, not shown but having prongs as described, are mounted by any suitable means as described herein. The prongs are, however, in alignment with the slots of movable female connector 210. The slots are in the side opposite side 211.

Accordingly, manipulation of handle 238 effectuates movement of 210 into and out of engagement with the prongs of the ballast.

Such movement is accompanied by snap action in either direction resulting from the variation in the tension of helical spring 234. The travel of 210 is limited by movement of toe 212 with lip 214 within slot 216.

It will be understood that the foregoing description of the invention and the examples set forth are merely illustrative of the principles thereof. Accordingly, the appended claims are to be construed as defining the invention within the full spirit and scope thereof.

I claim:
1. A fluorescent lighting unit comprising:
a readily detachable screw-free attachable ballast mounted on a support, the ballast being:
(a) guidable by means on the support
(b) tightly pressed with its base onto the support in operating position, and
(c) provided with one-half of an electrical connector unit, and
(d) inserted into means for holding one end of the ballast,
the other end of the ballast being engaged by locking means which, when actuated, moves the ballast into and out of said holding means,
said ballast comprising a capacitor and a transformer, the capacitor and transformer being positioned, respectively, close to and away from said one-half of the electrical connector unit.

2. A fluorescent lighting unit comprising:
a readily detachable screw-free attachable ballast mounted on a support, said ballast providing regulation of the electrical energy which operates the fluorescing component in said lighting unit, the ballast being:
(a) guidable by means on the support, and
(b) inserted into means for holding a portion of the ballast, and
the ballast being engaged by locking means which, when actuated, moves the ballast into and out of said holding means.

3. A fluorescent lighting unit in accordance with claim 2 wherein the locking means comprises: cam mechanism.

4. A fluorescent lighting unit in accordance with claim 2 wherein the locking means comprises: a combination of articulated linkages constituting crank mechanism.

5. A fluorescent lighting unit in accordance with claim 2 wherein the locking means comprises: an arcuate spring.

6. A fluorescent lighting unit in accordance with claim 5 including means for actuating the arcuate spring.

7. A fluorescent lighting unit in accordance with claim 6 including means to move the arcuate spring past dead center.

8. A fluorescent lighting unit in accordance with claim 2 wherein the locking means comprises: a tongue having a handle, said handle having a pair of ears, link means carried by said ears, and a U-shaped spring connecting said link means with an element of the ballast support.

9. A fluorescent lighting unit in accordance with claim 2 including means for driving said locking means, and means for automatically locking said driving means after the ballast is in locked position.

10. A fluorescent lighting unit in accordance with claim 2 wherein the said portion of the ballast is a toe and the means for holding said toe comprises: a resilient member which, when subjected to pressure by said toe, undergoes movement to allow said toe to pass said resilient member and to become supported by said resilient member.

11. A fluorescent lighting unit in accordance with claim 10 including means for actuating the resilient member to release the ballast.

References Cited by the Examiner

UNITED STATES PATENTS

| | | | |
|---|---|---|---|
| 2,702,378 | 2/1955 | Talty | 336—107 X |
| 2,706,266 | 4/1955 | Marks | 339—50 X |
| 2,815,492 | 12/1957 | Henderson | 336—212 X |
| 2,857,558 | 10/1958 | Fiske | 317—101 |
| 2,918,640 | 12/1959 | Higgs | 336—107 X |

ROBERT K. SCHAEFER, *Primary Examiner.*

JOHN F. BURNS, *Examiner.*

D. J. BADER, *Assistant Examiner.*